United States Patent Office 3,527,784
Patented Sept. 8, 1970

3,527,784
ALKALI METAL IMPREGNATED MOLECULAR
SIEVE MIXED WITH ALKALI METAL IM-
PREGNATED CHARCOAL BOTH IN PARTIC-
ULATE FORM FOR FLUIDIZED BED SYNTHE-
SIS OF ACRYLONITRILE
Clifford E. Smith, Bartlesville, Okla., assignor to Phillips
Petroleum Company, a corporation of Delaware
No Drawing. Filed June 23, 1967, Ser. No. 648,230
Int. Cl. C07c 121/04
U.S. Cl. 260—465.3                2 Claims

ABSTRACT OF THE DISCLOSURE

Charcoal impregnated with an alkali metal cyanide, an excellent catalyst for synthesis of acrylonitrile from HCN and $C_2H_2$, but which is not operable in a fluidized bed in this reaction, is rendered fluidizable therein by admixing same with zeolite particles impregnated with an alkali metal cyanide, the impregnated zeolite particles being in the range of 20 to 80 vol. percent of the resulting mixture. The resultnig mixture is used in a fluidized bed in the synthesis of acrylonitrile.

---

This invention relates to a method of rendering an alkali metal impregnated charcoal catalyst fluidizable in the synthesis of acrylonitrile from acetylene and HCN and to a mixture of catalyst particles for fluidized-bed operation in acrylonitrile synthesis consisting essentially of the charcoal catalyst particles and alkali metal cyanide-impregnated molecular sieve particles. Another aspect of the invention relates to a process for synthesizing acrylonitrile using the mixture of catalyst particles.

The synthesis of acrylonitrile from HCN and $C_2H_2$ utilizing alkali metal cyanide-on-charcoal catalyst is a conventional process. Such a catalyst is made by impregnating charcoal with a combination of NaCN and KCN. A superior catalyst of this type is described in my copending application, Ser. No. 631,622 filed Apr. 18, 1967.

The acrylonitrile synthesis from acetylene and HCN is highly exothermic so that utilization of a fluid bed type reactor is highly desirable for a commercial process for heat exchange benefits. Charcoal-alkali metal cyanide catalysts have little utility in fluidized-bed synthesis of acrylonitrile in that a fluidized-bed of such a catalyst loses its fluidity after only a few minutes on-stream because the catalyst becomes tacky. Variations of cyanide loading temperature, and gas flow rates have been tried but none results in refluidization of the bed of charcoal particles. Other workers in the art have recognized this problem and various proposals have been made for mitigating the problem. For instance, U.S. Pat. 2,854,473 teaches that sea sand, caustic-treated sea sand, and sodium meta-silicate are suitable fluidizing agents. Others have tried other means of preventing loss of fluidization. For instance, U.S. Pat. 2,734,072 discloses that an alkali-metal treated, charcoal-supported catalyst in combination with alkali-metal treated supports of various kinds including silica, alumina, and other materials may be used as acrylonitrile catalysts in a fluidized bed system. I have tried such materials and none satisfactorily increases fluidization.

Accordingly, it is an object of the invention to provide a method for fluidizing particulate charcoal impregnated with alkali metal cyanides in a reaction zone in which acrylonitrile is being synthesized from HCN and $C_2H_2$. Another object is to provide a mixture of fluidizable catalyst particles including charcoal impregnated with an alkali metal cyanide which is maintainable in fluidized bed operation in the presence of HCN, $C_2H_2$, and acrylonitrile. A further object is to provide an improved method of synthesizing acrylonitrile from HCN and $C_2H_2$. Other objects of the invention will become apparent to one skilled in the art upon consideration of the accompanying disclosure.

A broad aspect of the invention comprises impregnating zeolite particles with one or more alkali metal cyanides and mixing the resulting particles with charcoal particles impregnated with one or more alkali metal cyanides to provide a mixture containing zeolite particles in the range of about 20 to 80 volume percent of the mixture. The resulting mixture of catalyst particles of a size amenable to fluidization has been found to remain in fluidized bed condition in the synthesis of acrylonitrile from a fluidizing gas comprising HCN and $C_2H_2$.

The zeolites which may be employed include a variety of materials. Zeolites of synthetic or natural origin may be used. Zeolites useful in the process of the invention have a basic formula, $M_{2/n}O \cdot Al_2O_3 \cdot xSiO_2 \cdot yH_2O$, where M is an alkali or alkaline earth metal of $n$ valence, $n$ is 1 or 2, $x$ is an integer, and $y$ is an integer. Such zeolites are of crystalline nature and are comprised of $SiO_2$ tetrahedron and $AlO_2$ tetrahedron units wherein tetrahedron units are each bonded to another by sharing an oxygen atom and wherein the deficiency of positive charge of the $AlO_2$ tetrahedron units is satisfied with alkali or alkaline earth cations such as $Na^+$, $Li^+$, $K^+$, $Rb^+$, $Be^{++}$, $Mg^{++}$, $Ca^{++}$, $Sr^{++}$, and $Ba^{++}$. Such zeolites useful in the process of this invention have such a substantial proportion of the "M" moiety ($Na^+$, $Li^+$, $Ca^{++}$, $Ba^{++}$, etc.) comprised of divalent ions that the zeolites are resistant to hot alkalimetal compounds. In other words, the zeolites of this invention are those having sufficient divalent "M" moieties to be substantially insoluble in hot alkali-metal cyanide solution and to be substantially resistant to sintering by such cyanide salts. To define the useful zeolites further, such zeolites are those that are not substantially deteriorated by the particular alkali compound employed to treat them under the treatment conditions employed and that are not substantially deteriorated by the environment to be found within a reactor operated under conditions employed within the scope of the invention. Zeolites in which about 20 percent or more of the "M" moieties are comprised of divalent ions are preferred. For example, presently preferred zeolite composition is exemplified by Linde 5A (trademark) molecular sieve, a zeolite of the formula, $Na_{12}[(AlO_2)_{12}(SiO_2)_{12}] \cdot 27H_2O$, wherein replacement of sodium ions ("M" moieties) with calcium ions has been effected.

The selected zeolite is treated in any conventional manner with the alkali metal cyanide to impregnate the zeolite therewith. For example, it is feasible to impregnate the zeolite and a solution of KCN and NaCN, followed by drying, grinding, and sieving, if necessary, the impregnated zeolite to provide suitable sized particles for fluidization. It is also feasible to utilize other alkali metal compounds which are readily convertible to the cyanides, such as alkali metal carbonates, hydroxides, and the like. The amount of alkali metal compound employed on the zeolite as well as the carbon black particles is in the range of about 0.5 to 50 weight percent based on the weight of the total composition to be employed. It is preferred to use loadings in the range of 5 to 30 weight percent of alkali cyanide on the solid particles.

Zeolites for the process are readily available from commercial sources but they may be prepared readily by means well-known to the art. The zeolite alkali-metal cyanide composition employed in the mixed catalyst particles is in the range of about 20 to 80 volume percent of the total fluidizable catalytic composition, preferably, in the range of 40 to 60 volume percent.

An oxide of an alkaline earth metal may be incorporated in the charcoal, in the zeolite, in both, or separately utilized in particulate form in the mixture to enhance fluidization of the total catalyst mixture. Such materials are employed in amounts in the range of about 0.1 to 10 percent by volume of the total catalytic composition, preferably in the range of 0.5 to 4 percent.

Any conventional charcoal-alkali metal cyanide catalyst may be used for this portion of the mixture. To illustrate, a solution of KCN and NaCN in water can be used to impregnate the charcoal after which it is dried and ground to suitable fluidization size. A particularly suitable charcoal catalyst is prepared in accordance with my aforesaid copending application. The impregnating solution may comprise alkali metal carbonates, hydroxides, and the like, the impregnation being followed by conversion to the cyanides by methods known in the art.

The composite catalytic composition including both the impregnated zeolite and impregnated charcoal may be prepared by any conventional technique. The final particles or agglomerates of ultimate particles must be of suitable size for fluidization. One suitable technique is presented by the example below.

The equipment to be utilized in effecting the acrylonitrile synthesis, as well as reaction rates, linear gas velocities, temperatures, pressures, times of contact, recycles, and the like, are those conventionally utilized in acrylonitrile synthesis from HCN and $C_2H_2$. The mesh size of the catalysts particles is in the range of 50 to 450. A temperature in the range of about 650 to 1200° F. and any convenient pressure, including atmospheric, are suitable in the process. High gaseous houly spaced velocities promote the desired reaction to some degree, but at the expense of lower conversion of the feed materials. Generally, however, the gaseous hourly space velocity to be used will be in the range of about 50 to 3000 v./v./hr. The ratio of hydrogen cyanide and acetylene in the feed stream may vary over a wide range but will generally approximate the stoichiometric proportions. An excess of acetylene is sometimes beneficial. Other gases such as hydrogen or inert gases such as nitrogen can also be present in the feed stream. Optimums of process variables can readily be determined by one skilled in the art for a particular situation.

The value and operability of this invention are clearly demonstrated by the example below which is not to be construed as unnecessarily limiting the invention, but only illustrative thereof.

Conventional alkali-on-charcoal catalysts for acrylonitrile production were prepared by soaking "Chief Chetopa" charcoal (a common cook-out type charcoal in briquet form from hardwoods such as oak, maple, and the like) that had previously been ground and sieved to 100–200 mesh size, in an aqueous solution of NaCN and KCN (equal weight amounts). The solutions were of such strength and the soakings were for such times as to impart loadings of cyanide salts on the charcoal as are listed in tables of the following example. Loadings of cyanide salts are expressed thus:

$$\frac{(\text{Total weight of NaCN}+\text{KCN})(100)}{(\text{Weight of NaCN}+\text{KCN})+(\text{wt. of charcoal})}$$

After soaking, the alkali-on-charcoal catalysts were dried in a vacuum oven.

An example of the zeolites of this invention, Linde 5A Molecular Sieve, a trademark for a commercial product, and silica gels of the prior art were treated with NaCN and KCN. The cyanide mixture (equal weight amounts of KCN and NaCN) was dissolved in water and the solution was added to the silica gel or molecular sieve of each run in a sufficient amount to effect the loadings noted. The cyanide treated materials were then dried in a vacuum oven, ground, and screened to the selected mesh sizes.

EXAMPLE

To an 8 mm. diameter, quartz, upflow, fluidized bed type reactor in each run was charged 1 cc. of each of the selected catalytic compositions. The catalytic compositions were then activated in a stream of 10 percent HCN and 90 percent $H_2$ (volume percent) at 1050° F. for about 60 minutes prior to the initiation of each run. To the reactor of each run was then passed a feed gas stream comprised of 10% acetylene, 10% HCN and 80% hydrogen (by volume) at a linear gas velocity of 1.25 inches per second. Reaction temperature was 1050° F. in each run. Fluidization times were noted, in other words, the time between the start of the run and the time that the catalytic composition failed to fluidize. Pertinent data are summarized in the following table:

TABLE

| Fluidization aid | Percent fluidization aid of catalytic composition (vol.) | Percent NaCN-KCN on charcoal (wt.) | Charcoal catalyst mesh size | Fluidization aid mesh size | Fluidization time (hrs.) |
|---|---|---|---|---|---|
| 20% NaCN-KCN [1] on mole sieve | 50 | 8.0 | 100–200 | 100–200 | [2] 6.0+ |
| Do | 50 | 17.5 | 100–200 | 100–200 | [3] 6.0 |
| Do | 50 | 23.0 | 100–200 | 100–200 | 1.67 |
| 10% NaCN-KCN on mole sieve | 50 | 17.5 | 100–200 | 100–200 | 4.0+ |
| None | 0 | 8.0 | 100–200 | | [4] 0.0 |
| 18% NaCN-KCN on Fisher silica gel | 50 | 8.0 | 100–200 | 100–200 | [4] 0.0 |

[1] The percent NaCN-KCN is on a weight basis based on the entire fluidization aid. The mole sieve is Linde 5A mole sieve, described above.
[2] The "+" signifies that the composition was still fluidizing when the reactor was shut down.
[3] The catalyst of this run was regenerated in 30% air in nitrogen after the run and subsequently run for an additional 5.67 hr. fluidization time under similar conditions.
[4] The materials stopped fluidizing immediately upon introduction of the reactive feed gas.

This example demonstrates that the alkali treated zeolites of this invention as exemplified by NaCN-KCN Linde 5A mole sieve are effective fluidization aids for alkali-on-charcoal catalytic compositions for the conversion of HCN and acetylene to acrylonitrile. Materials of the prior art represented by silica gel are demonstrated to be ineffective. Alkali-on-charcoal catalyst per se is demonstrated to be non-fluidizable.

Certain modifications of the invention will become apparent to those skilled in the art and the illustrative details disclosed are not to be construed as imposing unnecessary limitations on the invention.

I claim:

1. In a fluidized bed process for forming acrylonitrile from HCN and acetylene by employing charcoal particles impregnated with alkali metal cyanides, the improvement comprising rendering fluidizable under reaction conditions said impregnated charcoal particles by admixing therewith fluidizable particles of zeolite impregnated with at least one alkali metal cyanide to provide a mixture in which the impregnated zeolite particles are in the range of 20 to 80 volume percent of the mixture and wherein the concentration of the alkali metal cyanide of the impregnated zeolite particles is in the range of .5 to 50 weight percent.

2. The process of claim 1 wherein said charcoal and zeolite particles are impregnated with NaCN and KCN in substantially equal amounts and said zeolite particles are in the range of about 40 to 60 volume percent of the mixture and the concentration of the alkali metal cyanide of the impregnated zeolite particles is in the range of about 5 to 30 weight percent.

References Cited

UNITED STATES PATENTS

| | | | |
|---|---|---|---|
| 2,413,496 | 12/1946 | Green et al. | 260—465.3 |
| 2,419,186 | 4/1947 | Harris et al. | 260—465.3 |

JOSEPH P. BRUST, Primary Examiner

U.S. Cl. X.R.

252—438